Feb. 16, 1926.  
G. DE BOTHEZAT  
1,573,228  
HELICOPTER  
Filed June 27, 1923 — 3 Sheets-Sheet 1

INVENTOR  
BY George de Bothezat  
Robert H. Young ATTORNEY

INVENTOR
BY George de Bothezat
Robert H. Young ATTORNEY

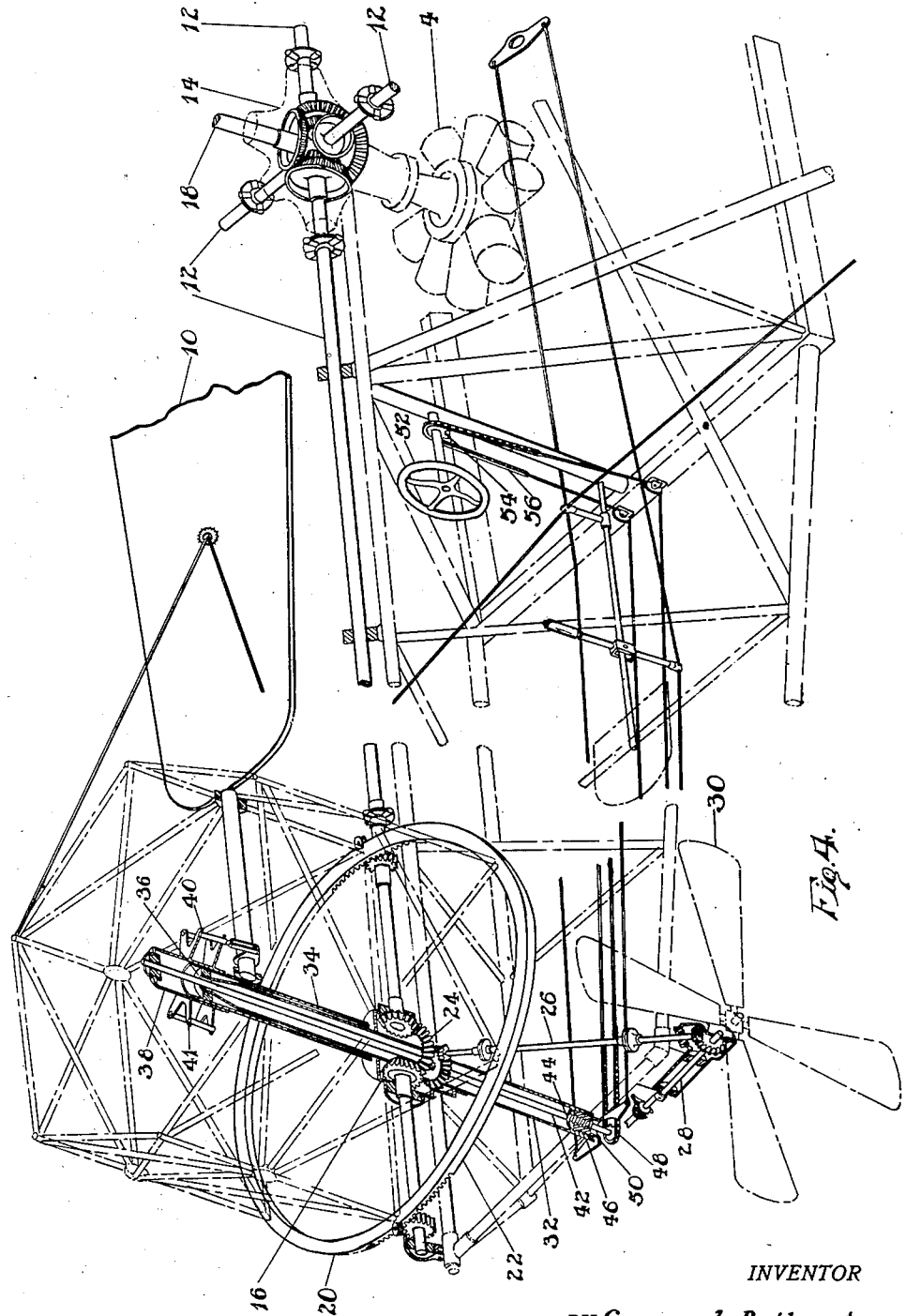

Patented Feb. 16, 1926.

1,573,228

UNITED STATES PATENT OFFICE.

GEORGE DE BOTHEZAT, OF DAYTON, OHIO.

HELICOPTER.

Application filed June 27, 1923. Serial No. 648,051.

*To all whom it may concern:*

Be it known that I, GEORGE DE BOTHEZAT, a citizen of Russia, residing at 205 Lexington Ave., Dayton, in the county of Montgomery and State of Ohio, have invented certain new and useful Improvements in Helicopters, of which the following is a specification.

The invention herein disclosed involves the application of basic principles of aerodynamics in a new type of helicopter and relates particularly to the evolution of this type of aircraft from an unstable and impractical to a stable and practical form.

It is an object to produce aircraft of the type referred to which will possess complete inherent stability, ready maneuverability, essential to render aircraft navigable, and a safety factor of high degree.

A further object is to provide lifting propellers with practical and efficient means for the double adjustability and control of vertical and horizontal flight and for horizontal stability. In this connection, such means are provided to vary any or all of the propellers from a maximum positive to a maximum negative thrust angle or to vary the relative pitch of opposite propellers.

Another object is to provide ample and effective means for controlling the rapidity of descent of the machine whether it be under power of a prime mover or otherwise.

With the above and other objects in view, which will become apparent as the disclosure proceeds, the invention consists in the novel construction, combination and arrangement herein described, illustrated and claimed.

In the drawings:

Fig. 4 is a detail view partly in section of one nacelle or arm and

Figure 1:
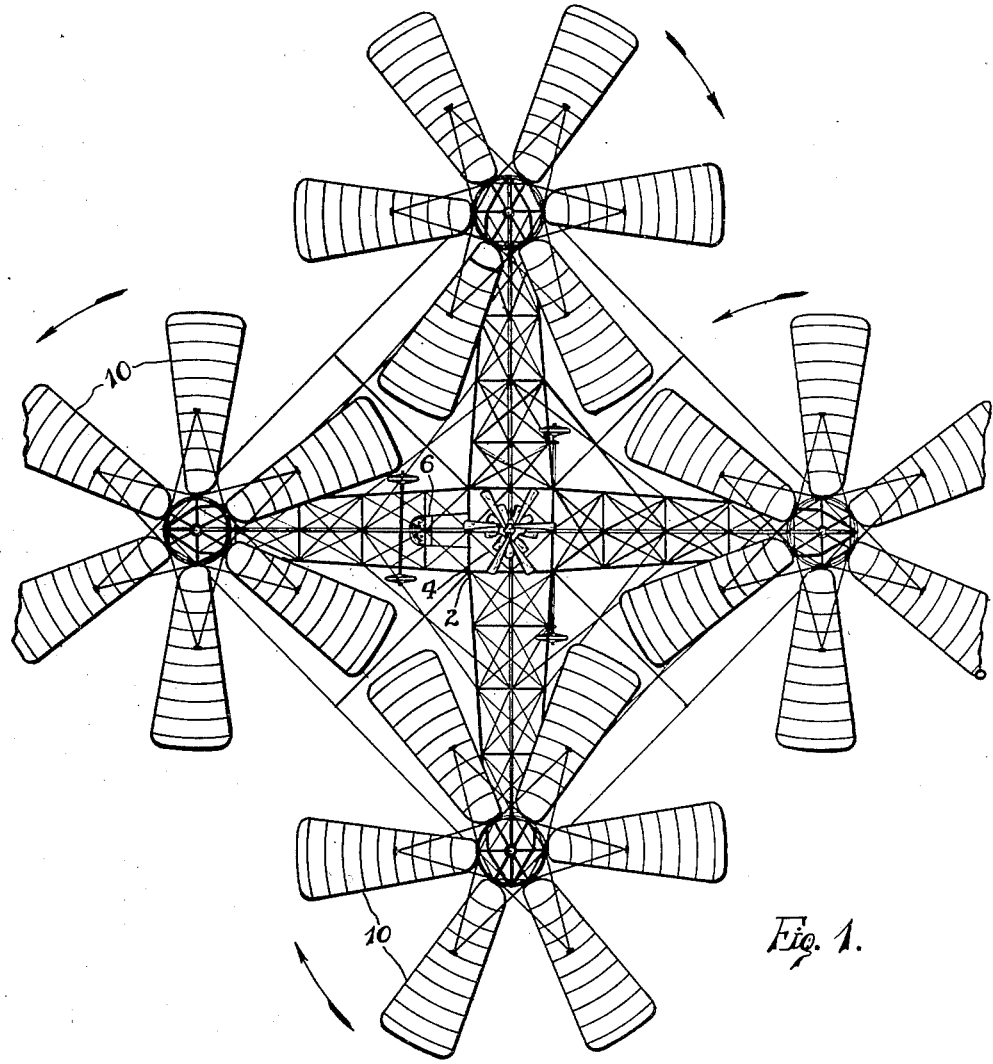
Fig. 1 is a top plan view of an embodiment of the invention.
Figure 2:
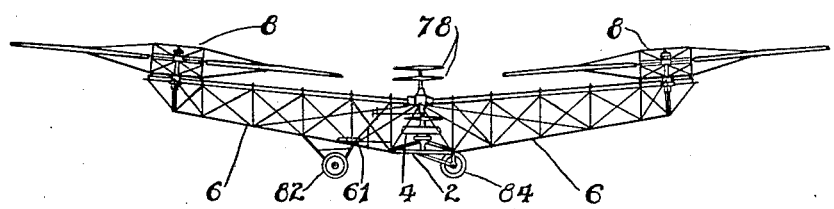
Fig. 2 is a side elevation thereof.

The machine illustrated comprises a central frame member 2 adapted to support a suitable prime mover 4, and a plural number of structural arms or which I may term nacelles, generally designated 6. One of the nacelles is adapted to contain a seat 6' for the pilot, while each may support a suitable propeller 8 and driving apparatus such as is shown in Fig. 4.

In the illustrated embodiment of my invention, I have shown four propellers as arranged equidistant from the center of the machine, but it will be apparent that any number, three or more, may be used as desired. Each propeller should be designated identically with the others in order to have equal lift and is composed of a plurality of blades 10 which are so mounted with respect to the hub that they may be varied in pitch or reversed as respects a positive pitch, as will hereinafter more particularly appear. The propellers are inclined inwardly in so far as their plane of rotation is concerned, that is, their axes of rotation are inclined radially inward toward the center of the machine in order to attain the horizontal stability usually obtained by a dihedral angle in the common airplane. Suitable transmission 12, 14, 16 may be designed to drive the propellers from the centrally located prime mover 4 and as such mechanism per se forms no part of the present invention, it will be but briefly described.

Figure 5:
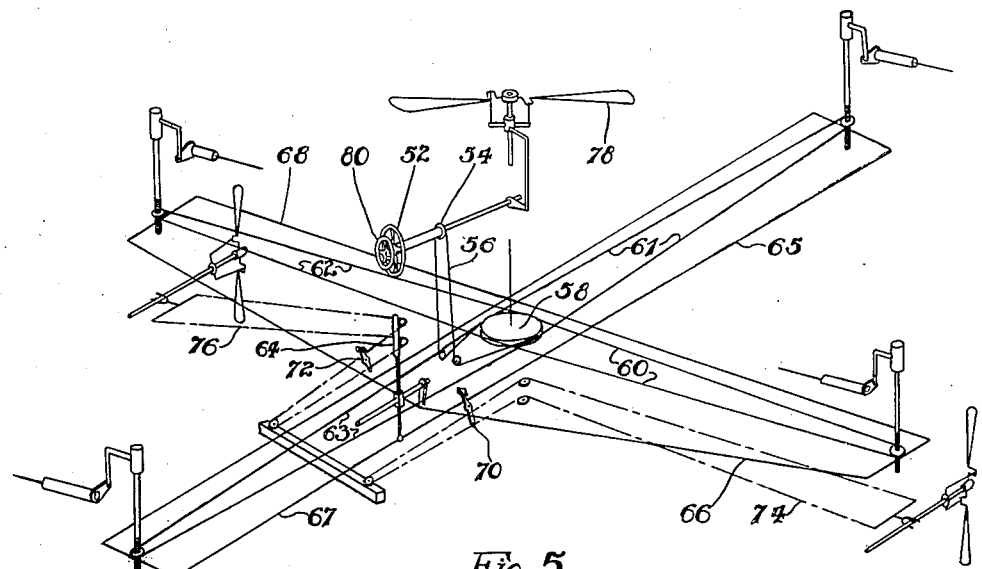
Fig. 5 is a perspective view of the control mechanism and controls.
Figure 3:
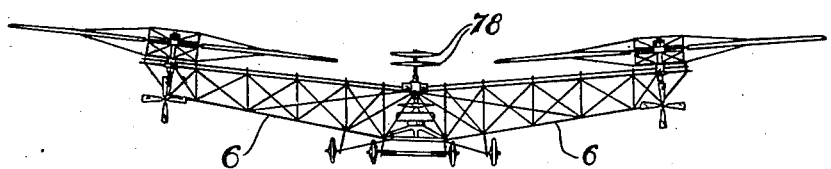
Fig. 3 is a side elevation taken at right angles to the view of Fig. 2.

The motor or prime mover 4, suitably mounted in the central frame drives main shaft 18 and each of jack shafts 12 to which are connected turrets 20 driven through ring and center gearing 22, 24, respectively. Geared to be driven from the central shaft 12 is a shaft 26 driving counter shaft 28 on which is fixed a propeller 30 for driving the machine in a horizontal plane. A similar propeller is arranged on the opposite arm or a nacelle for the same purpose as shown in Figs. 3 and 5.

I have merely shown the propeller adjusting and reversing mechanism schematically as such devices are well known in the art. It comprises a hollow shaft 32 fixed to the frame work, and extending upwardly to a floating bearing 36 which acts as a hub for hollow shaft 34, which carries the reversing and adjusting sleeve 38 and levers 40, 41, respectively. The sleeve 38 is adapted to slide up and down along shaft 34 and is operated by movement of shaft 42, in turn moved by spiral threads 44 or 46, the former for setting the pitch of all propellers simultaneously and the latter for lateral stability control, by relative variations of opposite propellers, operated by a sprocket 48 and lever 50, respectively.

In setting the pitch of all the lifting propellers, the hand wheel 52 is turned which moves sprocket 54, driving chain 56 which passes over auxiliary pulleys to master pulley 58 from which controls 60, 61, 62 and 63 radiate to sprockets such as shown at 48 in Fig. 4. From the stick control 64 a series of controls 65, 66, 67, and 68, similar to the pitch controls, radiate to control levers such as are shown at 50 in Fig. 4, to vary the relative pitch of opposite propellers for lateral stability.

The directional propellers 30 are also of relatively variable pitch in order to turn the machine about its vertical axis. The pitch of these propellers is varied by means of levers 70, 72, connected to control means 74, 76, either being operable independently of the other. The mechanism for accomplishing this control is similar to that for controlling the lifting blades and will not be further described.

During descent, the blades of the lifting propellers are reversed as to pitch if desired, should the motor stop, and under such a condition the blades may reach a high rotational velocity. In order to brake this action, I provide a plurality of lifting screws 78 as shown in Fig. 3, which are adjustable and reversible by means similar to that heretofore described and operated by the pilot by means of small hand wheel 80. The pitch of these blades may at any time be reversed as respects the pitch of the main lifting blades, but may be used to augment the lifting effect of such main lifting propellers when ascending.

From the foregoing, it will be apparent that the rate of climb or descent, the horizontal stability and maneuverability may be controlled at will be the pilot. Should the helicopter become disabled from loss of power or complete stoppage of the motor, the machine may be safely returned to earth by mere reversal and re-reversal of the lifting screws or propellers. This saftey feature consists in reversal of the pitch of lifting propellers to a negative angle, maintaining their rotation in the same direction by windmill action. As the machine approaches the earth the propellers are quickly reversed to their normal or lifting pitch and because of the flywheel action of the engine will continue their rotation in the same direction which will afford a braking and cushioning effect on the downward movement of the machine.

In Fig. 1 of the drawings, the arrows indicate the preferable directions of rotation of the lifting propellers, opposite propellers rotating in the same direction and adjacent propellers rotating in opposite directions. In order to equalize the torque of the directional and the auxilliary lifting and braking propellers 78, they are arranged to rotate in opposite directions in a like manner.

Any appropriate landing gear such as shown at 82, 84, may be used.

I claim:

1. A helicopter comprising in combination, a body portion having four radial arms, a lifting propeller at the outer end of each arm, the axes of rotation of all said lifting propellers intersecting at a point far above the said body portion, a vertical stick control lever pivoted about a plurality of horizontal axes, and means for increasing the pitch of the blades of a lifting propeller on one side of the helicopter and decreasing the pitch of the blades of an opposite lifting propeller when said lever is pivoted about one of said axes, and a second control device for increasing or decreasing the pitch of all of said lifting propellers simultaneously.

2. A helicopter comprising in combination, a body portion having four radial arms, a lifting propeller at the outer end of each arm, the axes of rotation of all said lifting propellers intersecting at a point far above the said body portion, a vertical stick control lever pivoted about a plurality of horizontal axes, means for increasing the pitch of the blades of a lifting propeller on one side of the helicopter and decreasing the pitch of the blades of an opposite lifting propeller when said lever is pivoted about one of said axes, a second control device for increasing or decreasing the pitch of all of said lifting propellers simultaneously, a motor having a vertically arranged main axis centrally arranged on said body portion, and a propeller rotatable about a vertical axis, arranged directly above said motor.

3. A helicopter comprising in combination, a body portion having four radial arms, a lifting propeller at the outer end of each arm, the axes of rotation of all said lifting propellers intersecting at a point far above the said body portion, a vertical stick control lever pivoted about a plurality of horizontal axes, means for increasing the pitch of the blades of a lifting propeller on one side of the helicopter and decreasing the pitch of the blades of an opposite lifting propeller when said lever is pivoted about one of said axes, a second control device for increasing or decreasing the pitch of all of said lifting propellers simultaneously, a motor having a vertically arranged main axis centrally arranged on said body portion, a propeller rotatable about a vertical axis, arranged directly above said motor, said lever being also operable when pivoted about said other axis to differentially change the pitch of the blades of the front and of the rear lifting propellers.

4. A helicopter comprising in combination, a body portion having four radial arms of substantially equal length, a lifting propeller at the outer end of each arm, the axes of rotation of all of said lifting propellers intersecting at a point far above the said body portion, means for increasing the pitch of the blades of a lifting propeller on one side of the helicopter, and simultaneously decreasing the pitch of the blades in an opposite lifting propeller, a plurality of tractor propellers located distant from the longitudinal axis of the helicopter, and means for controlling the pitch of the blades of said tractor propellers for the purpose described.

5. A helicopter comprising in combination, a body portion having four radial arms of substantially equal length extending longitudinally and laterally thereof, a lifting propeller at the outer end of each arm, the axes of rotation of all of said lifting propellers intersecting at a point far above the said body portion, a vertical stick control lever pivoted about a longitudinally and laterally extending axis, means for increasing the pitch of the blades of one lateral lifting propeller and decreasing the pitch of the blades of the opposite lifting propeller when said lever is pivoted about said longitudinal axis, means for differentially changing the pitch of the blades of the front and rear lifting propellers when said lever is pivoted about said transverse axis, means for increasing or decreasing the pitch of all of said lifting propellers simultaneously, a centrally located motor for driving said lifting propellers, a plurality of tractor propellers and means for independently controlling the pitch of the blades of each of said tractor propellers.

In testimony whereof I affix my signature.

GEORGE DE BOTHEZAT.